Dec. 5, 1944.  E. P. JANKE  2,364,367
PLOW
Filed July 14, 1942  2 Sheets-Sheet 2

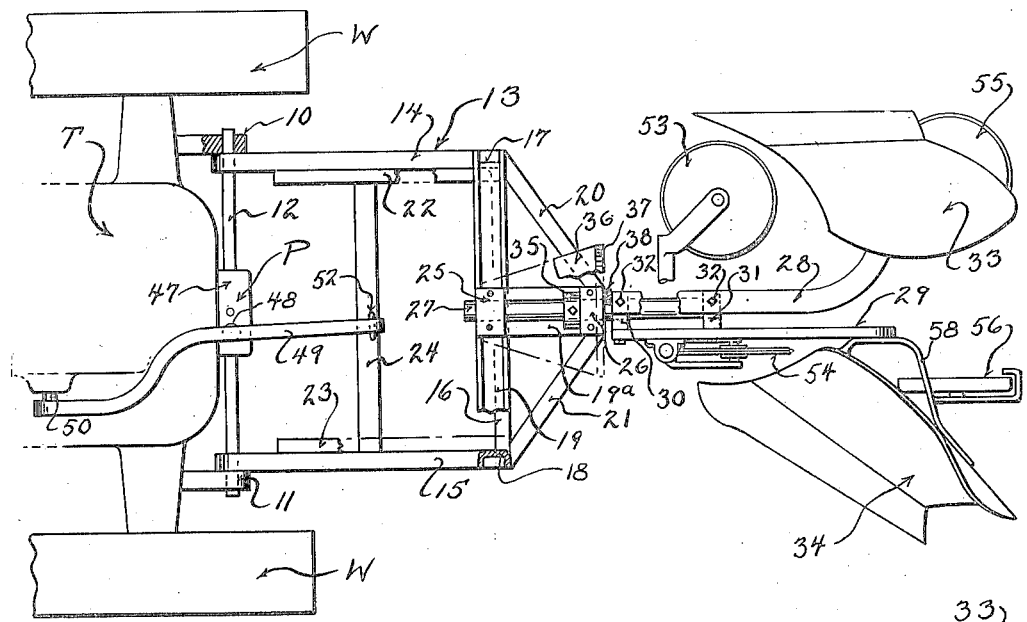

INVENTOR
Ewald P. Janke
BY
Emerson B. Donnell
ATTORNEY

Patented Dec. 5, 1944

2,364,367

UNITED STATES PATENT OFFICE 2,364,367

PLOW

Ewald Peter Janke, Charles City, Iowa, assignor to J. I. Case Company, Racine, Wis., a corporation Application January 14, 1942, Serial No. 426,659

2 Claims. (Cl. 97—26)

The present invention relates to plows and more particularly to the type which are attached to a tractor, and an object of the invention is to generally improve the construction and operation of devices of this class.

More particularly an object of the invention is to provide a tractor attached plow of the hillside or two-way type including a pair of plow bottoms arranged for right hand and left hand operation and disposed relatively to a longitudinal axis so that one plow may be swung into operation with corresponding movement of the other plow out of operation.

The principal object of the invention is to provide improvements in the construction of such a plow looking toward efficiency in operation, economy in manufacture and ease of attachment and detachment from a tractor.

Other objects and advantages will appear as the specification proceeds.

The invention is described in the following specification and illustrated in the accompanying drawings in which Figure 1 is a plan view with parts broken away of an illustrative embodiment of the invention.

Fig. 2 is a left side elevation of the same with parts broken away.

Figure 3:
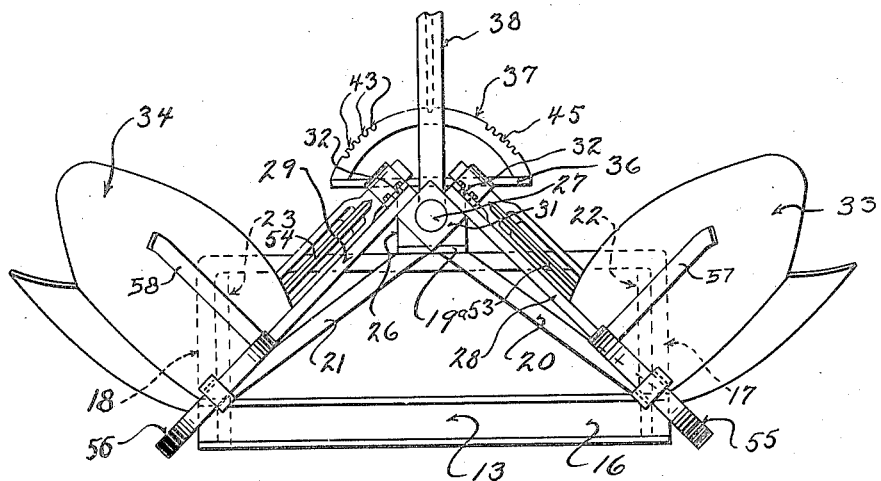
Fig. 3 is an enlarged view of the implement with the parts in a different position.

As seen in Fig. 1, the implement is shown attached to a tractor T which includes a power lift unit P and traction wheels W—W. The tractor otherwise forming no part of the present invention, it need not be further described. Tractor T is provided with rigid draw elements 10 and 11 which carry a pivot shaft 12 through which the implement is drawn. Pivot shaft 12 has pivotally attached thereto a frame generally designated as 13 having side elements 14 and 15 connected by a cross brace 16 forming thereby a substantially U shaped member. Upwardly extending portions 17 and 18 extend from the extremities of member 16 to a transverse portion 19 to solidly support a foundation plate 19ª from frame 13. Other braces 20 and 21 extend from the rearward extremity of plate 19ª downwardly to the juncture of members 17 and 18 respectively with member 16. Other braces 22 and 23 extend respectively from the junctures of portions 17 and 18 with portion 19 downwardly to members 14 and 15 respectively. In this way a very solid anchorage of plate 19ª to member 13 is achieved, but with plate 19ª generally to the rear and above member 13. A cross member 24 extends between members 14 and 15 and by means of which member 13 may be lifted as will appear.

Plate 19ª carries bearings 25 and 26 in which is journaled a shaft 27 extending rearwardly of plate 19ª and to which are secured plow beams 28 and 29. The beams may be secured in any suitable manner but in the present instance blocks 30 and 31 are secured to shaft 27 and to which beams 28 and 29 are secured in any suitable manner as by bolts or the like 32—32. Plow bottoms 33 and 34 are secured to beams 28 and 29 respectively, the plows being of right hand and left hand type to provide for two-way operation.

As will be apparent, shaft 27 may be rotated in bearings 25 and 26 so as to bring one or the other of plow bottoms 33 and 34 into contact with the soil. Forward motion of tractor T will then pull the plows and plow the soil in well-known manner. Endwise movement of shaft 27 in bearings 25 and 26 is prevented by a collar or the like 35, securely fastened to shaft 27 in well-known manner. To stiffen the structure against the considerable stresses of plowing, bearings 25 and 26 are preferably connected by a bracing plate 36.

Figure 4:
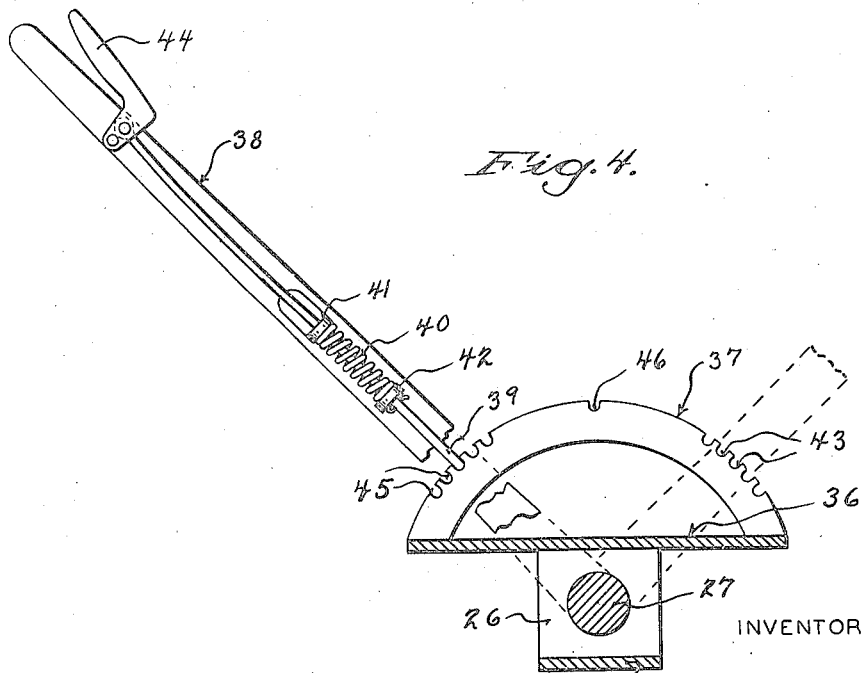
Fig. 4 is an enlarged sectional view taken on the line 4—4, Fig. 2, looking toward the rear.

As more particularly seen in Figs. 2 and 4, a quadrant 37 is fixed with plate 36 while a lever 38 adjacent the quadrant is fixed with shaft 27. Lever 38 preferably extends in a plane substantially bisecting the angle between plow beam 28 and 29. As more particularly shown in Fig. 4, lever 38 is provided with a detent 39 pressed by a spring 40 compressed between an abutment 41 and a washer or the like 42 on the detent into one or another of notches 43—43 in above mentioned quadrant 37, a handle 44 on lever 38 releasing detent 39 when desired. With detent 39 released, lever 38 may be moved to rotate shaft 27 to swing plows 33 and 34 for placing them in different positions. With detent 39 in one or another of notches 43, the left hand plow, 34, will be in the ground and slight adjustments of the parts may be effected for leveling the plow or compensation for different degrees of tilt of the tractor by placing detent 39 in one or another of notches 43. When it is desired to use the right hand plow 33, detent 39 is disengaged and lever 38 placed in position with detent 39 engaged with one or another of notches 45, the appropriate notch being selected so that the plow will run level, or in the desired attitude.

For transporting the implement to and from the field, a central notch 46 is provided in quadrant 47 and if detent 39 is placed in notch 46 the plows will be positioned midway between working and non-working position in which the clearance will be substantially increased to prevent inadvertent contact with the ground.

Power lift P may be of any suitable type within the contemplation of the invention, but in the present instance comprises a housing 47 fixed on tractor T and having a vertically moving plunger 48 which is raised by the power of the tractor engine in well-known manner not necessary to describe further. In the present instance a lever 49 is fulcrumed at 50 on tractor T and extends rearwardly over plunger 48 and cross member 24. A roller or other suitable bearing means 51 is preferably interposed between plunger 48 and lever 49 so that plunger 48 may raise lever 49 with considerable force but without excessive friction. Lever 49 is connected by a chain or the like 52 with above mentioned cross member 24 so that up-and-down movement of lever 49 will cause pivotal movement of frame 13 about pivot shaft 12. Actuation of power lift P in well-known manner will accordingly cause raising of lever 49 and frame 13 and the attached plows.

The usual auxiliaries common to plows of this type are preferably provided when conditions require, for example, rolling coulters of suitable type generally designated as 53 and 54 are attached respectively to beams 28 and 29. Also rolling landsides of any suitable or well-known type generally designated as 55 and 56 are provided, in the present instance, supported from braces 57 and 58 extended between beams 28 and 29 and plows 33 and 34.

It is understood that variations of the disclosed structure are contemplated as within the scope of the invention which is not to be taken as limited by this description or in fact in any manner.

The above being a complete description of an illustrative embodiment of the invention what is claimed as new and desired to be secured by Letters Patent of the United States is:

1. A two-way plow comprising in combination a wheeled tractor, a substantially horizontal frame having means at spaced points along the front edge pivotally attaching the same to said tractor on a horizontal pivotal axis arranged transversely of the tractor, a shaft journaled on the frame and extending to the rear of said frame, right and left plows fixed on said shaft, respectively parallel to longitudinal planes intersecting substantially at right angles to each other on a line parallel to said shaft, and said plows being arranged for pivotal movement with said shaft, a lever fixed with said shaft for swinging said plows into operative and inoperative positions, and locking means on said frame engaging said lever for holding the same and said plows in selected positions, said locking means defining a central position of said lever for holding both of said plows in an inoperative position, a plurality of positions at one side of said central position for leveling one of said plows in working position, and a plurality of positions at the other side of said central position for leveling the other plow in working position.

2. A two-way plow comprising in combination a wheeled tractor, a substantially horizontal frame having means at spaced points along the front edge pivotally attaching the same to said tractor on a horizontal pivotal axis arranged transversely of the tractor, a shaft journaled on the frame and extending to the rear of said frame, right and left plows fixed on said shaft, respectively parallel to longitudinal planes intersecting substantially at right angles to each other on a line parallel to said shaft, and said plows being arranged for pivotal movement with said shaft, a lever fixed with said shaft for swinging said plows into operative and inoperative positions, a detent on said lever and a quadrant on said frame, said quadrant having a central notch engageable with said detent for holding said lever and both of said plows in an inoperative position, a plurality of notches at one side of said central notch engageable with said detent for leveling one of said plows in working position, and a plurality of notches at the other side of said central notch engageable with said detent for leveling the other plow in working position.

EWALD P. JANKE.